US008447816B2

(12) United States Patent
Tian

(10) Patent No.: US 8,447,816 B2
(45) Date of Patent: May 21, 2013

(54) COMMUNICATION TERMINAL, MAIL PUSH SYSTEM AND METHOD THEREOF

(75) Inventor: Rihui Tian, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 95 days.

(21) Appl. No.: 12/239,580

(22) Filed: Sep. 26, 2008

(65) Prior Publication Data

US 2009/0089388 A1  Apr. 2, 2009

(30) Foreign Application Priority Data

Sep. 30, 2007 (CN) .......................... 2007 1 0175560

(51) Int. Cl.
*G06F 15/16* (2006.01)
(52) U.S. Cl.
USPC .......................................... 709/206; 709/207
(58) Field of Classification Search
USPC ................. 709/201, 202, 203, 204, 206, 207; 455/412.1, 412.2
See application file for complete search history.

(56) References Cited

U.S. PATENT DOCUMENTS

| | | | | |
|---|---|---|---|---|
| 6,983,313 | B1 * | 1/2006 | Korkea-Aho | 709/219 |
| 7,444,383 | B2 * | 10/2008 | Horvitz | 709/207 |
| 7,895,309 | B2 * | 2/2011 | Belali et al. | 709/223 |
| 2002/0087643 | A1 * | 7/2002 | Parsons et al. | 709/206 |
| 2002/0186845 | A1 * | 12/2002 | Dutta et al. | 380/247 |
| 2003/0040280 | A1 * | 2/2003 | Koskelainen | 455/67.1 |
| 2003/0172175 | A1 * | 9/2003 | McCormack et al. | 709/232 |
| 2004/0030753 | A1 * | 2/2004 | Horvitz | 709/206 |
| 2004/0098462 | A1 | 5/2004 | Horvitz et al. | |
| 2004/0199661 | A1 | 10/2004 | Murdock | |
| 2004/0215735 | A1 * | 10/2004 | Nakahara et al. | 709/207 |
| 2004/0254998 | A1 * | 12/2004 | Horvitz | 709/206 |

(Continued)

FOREIGN PATENT DOCUMENTS

| | | |
|---|---|---|
| CN | 1551011 A | 12/2004 |
| JP | 2004151794 A | 5/2004 |
| JP | 2006163509 A | 6/2006 |
| WO | WO2006058116 A | 6/2006 |

OTHER PUBLICATIONS

English translation of Office Action of the Japanese Patent Office for the Japanese corresponding application No. 2008-249199, issued Feb. 15, 2011.

(Continued)

*Primary Examiner* — Dhairya A Patel
(74) *Attorney, Agent, or Firm* — Kinney & Lange, P.A.

(57) ABSTRACT

A communication system, mail push system and method of pushing mail are disclosed. The communication terminal may comprise a parameter acquisition unit for acquiring at least one parameter related to a user usage state; an information transmission unit for transmitting, to a data processing device at a network side, first information including the at least one parameter related to the user usage state, a mail reception unit for receiving a mail from a mail push device at the network side, wherein the mail is pushed by the mail push device according to a mail push indication message which is related to the first information and second information from a second communication terminal, and the second communication terminal is separated from the communication terminal. The communication terminal, the mail push system and the method thereof may automatically select the communication terminal to which the mail is pushed, according to a parameter related to the current user usage state.

12 Claims, 3 Drawing Sheets

U.S. PATENT DOCUMENTS

| | | | |
|---|---|---|---|
| 2005/0136942 A1* | 6/2005 | Timiri et al. | 455/456.1 |
| 2005/0144000 A1 | 6/2005 | Yamasaki et al. | |
| 2005/0227739 A1* | 10/2005 | Dowling et al. | 455/566 |
| 2006/0052086 A1* | 3/2006 | Funato | 455/411 |
| 2007/0156817 A1 | 7/2007 | Daffner et al. | |
| 2007/0162582 A1* | 7/2007 | Belali et al. | 709/223 |
| 2008/0059579 A1* | 3/2008 | Maes | 709/204 |
| 2008/0089302 A1* | 4/2008 | Godfrey et al. | 370/338 |

OTHER PUBLICATIONS

Search Report and Written Opinion from the European Patent Office for Application No. EP08165249, Feb. 5, 2009.

\* cited by examiner

COMMUNICATION TERMINAL, MAIL PUSH SYSTEM AND METHOD THEREOF

CROSS-REFERENCE TO RELATED APPLICATION(S)

This application claims the benefit of foreign priority from Chinese Patent Application No. 200710175560.0 filed Sep. 30, 2007

BACKGROUND OF THE INVENTION

1. Field of Invention

The present invention relates to a mail push technique, particularly to a communication terminal, a mail push system and a method thereof for implementing a mail push by a plurality of devices.

2. Description of the Related Technology

In a current mail system, a user may receive a mail passively and periodically via a mobile terminal according to a subscribed mail service; and may initiatively log on the mail system by the mobile terminal in order to check an electronic mailbox to receive a mail, thereby to enable mail data in both the mobile terminal and the electronic mailbox specified by the user to be synchronized. However, the user can not obtain the mail data instantly in both of the above two approaches.

To satisfy a requirement of the user for obtaining the mail data instantly, a push technique is applied to the mail system to form a mail push technique. According to a mail push service subscribed by the user, an email just received from the electronic mailbox may be pushed to the mobile terminal of the user initiatively, directly and instantly by the mail system which uses the mail push technique. With a widely applications of a wireless network, the mail push technique has become a very important business application. The so-called push technique refers to a technique of transmitting information initiatively to a client by a server, wherein information transmitted by the server is generally predetermined by the user.

In summary, the disadvantage in the current mail push solution is that the mail on an internal mail server of an enterprise or the mail on Internet mail server may only be pushed to the single communication terminal. However, in the current mail push solution, the communication terminal adapted for mail pushing may not be selected automatically according to the parameter related to the user current usage state and type of the mail.

SUMMARY OF CERTAIN INVENTIVE ASPECTS

Accordingly, one aspect provides a communication terminal, wherein the communication terminal to which a mail is pushed can be automatically selected according to a parameter related to a user usage state.

Another aspect provides a mail push system, wherein the communication terminal to which a mail is pushed can be automatically selected according to a parameter related to a user usage state.

Another aspect provides a mail push method, wherein the communication terminal to which a mail is pushed can be automatically selected according to a parameter related to a user usage state.

A technical solution of the present invention may be implemented as follows:

A communication terminal, comprises:

a parameter acquisition unit for acquiring at least one parameter related to a user usage state; an information transmission unit for transmitting, to a data processing device at a network side, first information including the at least one parameter related to the user usage state; a mail reception unit for receiving a mail from a mail push device at the network side, wherein the mail is pushed by the mail push device according to a mail push indication message which is related to at least the first information and second information from a second communication terminal, and the second communication terminal is separated from the communication terminal.

In one aspect, the parameter comprises the user usage state, and/or user position information, and/or device attribute information.

In another aspect, the user position information is acquired by a radio/infrared sensor, according to input processing, or by a temperature sensor.

In some aspects, the mail push device comprises a mail push server and a mail server; or the mail push device is a server for carrying out a mail push service and a mail service.

In certain aspects, the parameter acquisition unit is a user state sensing unit; the user state sensing unit detects based on radio/infrared sensing or the sensing which is determined based on the input/temperature, and acquires the current user usage state, which is transmitted to the parameter processing unit at the network side via the information transmission unit and the parameter acquisition unit at the network side.

In one aspect, the mail reception unit is a mail reception unit capable of supporting mail push client software.

In another aspect, the user state sensing unit is further used for timing detection and transmitting the current user usage state to the push device detection module.

In some aspects, the user state sensing unit is further used for detecting and transmitting the current user usage state to the push device detection module according to a request for detecting the current user usage state from the push device detection module.

In certain aspects, the communication terminal further comprises a push policy setting unit for setting a push policy on the communication terminal and transmitting the push policy to a push policy management module for storing therein.

A mail push system, comprises: a parameter acquisition unit for acquiring first information including at least second information and third information, the second information and the third information come from two separated communication terminals which belong to one user; a parameter processing unit for processing the fifth information including the third information and the fourth information, generating a mail push indication message including terminal information, the terminal information indicating a position attribute of at least one communication terminal; a mail push unit for acquiring a mail based on the indication of the mail push indication message, and pushing the mail to at least one communication terminal.

In one aspect, the second information/third information comprises: a user usage state, and/or user position information, and/or device attribute information; and further comprises only device attribute information.

The mail push system comprises a mail server and a mail push server, wherein the parameter processing unit is a user state detection unit in the mail push server, and the mail push server further comprises the parameter acquisition unit and the mail push unit.

In another aspect, the user state detection unit is used for transmitting a request for detecting a current user usage state to a user state sensing unit after information indicating that the mail is received is acquired from the mail server; selecting a communication terminal to which the mail is pushed, according to the current user usage state returned via the parameter acquisition unit by the user state sensing unit; and transmitting information indicating that the communication terminal is selected to the mail push unit.

In some aspects, the user state detection unit comprises a push device detection module, a push policy management module; wherein, the push device detection module is used for acquiring the current user usage state from the user state sensing unit after information indicating that the mail is received is acquired from the mail server, and transmitting the current user usage state to the push policy management module; the push policy management module is used for managing and storing a predetermined push policy; selecting the communication terminal to which the mail is pushed, according to the current user usage state and the push policy; and transmitting the information indicating that the communication terminal is selected to the mail push unit.

A mail push method, comprises: acquiring first information including at least second information and third information, the second information and third information come from two separated communication terminals which belong to one user; processing the first information including the second information and the third information, generating a mail push indication message including terminal information, the terminal information indicating a position attribute of at least one communication terminal; acquiring a mail based on the indication of the mail push indication message, and pushing the mail to at least one of the at least one communication terminal.

In one aspect, if the acquired information is user usage state information or position information, the method comprises: setting a push policy according to current user usage state or position information, and pushing the detected mail directly to one determined communication terminal which belongs to the user.

In another aspect, if the acquired information is user usage state/position information and device attribute information, the method comprises: setting a push policy according to current user usage state/position information and device attribute information, pushing the detected mail to a communication terminal which belongs to the user and supports the device attribute; and pushing a prompt message to at least one communication terminal which belongs to the user and does not support the device attribute.

In certain aspects, if the acquired eighth information is the user usage state, the method comprises predetermining the push policy, and further comprises: detecting that the mail arrives at the mail push server; selecting, by the mail push server, the communication terminal to which the mail is pushed, according to the current user usage policy and the push policy reported by the communication terminal; and pushing, by the mail push server, the mail to the selected communication terminal.

The method further comprises: detecting, by the communication terminal, the current user usage state on the communication terminal based on a policy, and reporting the current user usage state to the mail push server.

The method further comprises: initiating, by the mail push server, a request for detecting the current user usage state on the communication terminal; detecting, by all of the communication terminals wherein all of the communication terminals detect their current user usage states on the communication terminals, and reporting the current user usage states to the mail push server.

In one aspect, the push policy comprises: pushing the mail to the communication terminal which is currently used by the user; or, pushing the mail preferably to a notebook, if it is detected in the communication terminal that the notebook to which the mail is pushed is powered on; or, pushing the mail preferably to a desktop, if it is detected in the communication terminal that the desktop to which the mail is pushed is powered on; or, pushing the mail simultaneously to at least two communication terminals of a mobile terminal supporting the mail push function and a notebook/desktop supporting the mail push function among the communication terminals.

The mail push server pushes the mail to the selected communication terminal based on any of the of the following: a mail push technique WAP Push for notifying arrival of the mail based on WAP protocol, a mail push technique Phone Push for simulating the push of the mail to the mobile device by a telephone call, or a mail push technique IP Push for notifying arrival of the mail based on TCP/IP protocol.

Certain embodiments have advantages as follows: 1) according to the parameters related to the current user usage state adapted for different occasions, the user may select a most suitable communication terminal which is used by the user currently for processing the mail, based on the requirement for operating conveniently and flexibly; 2) according to different push policies predetermined by the user, the mail may be pushed to one communication terminal or a plurality of communication terminals simultaneously, and processing states of all the mails are completely simultaneous between the plurality of communication terminals; 3) it is supported by the present invention that the mail may be pushed to the plurality of communication terminals simultaneously, which guarantees that the user may obtain a mail prompt timely whichever communication terminal is used by the user currently, thereby working efficiency is improved.

DETAILED DESCRIPTION OF CERTAIN INVENTIVE EMBODIMENTS

Figure 1:
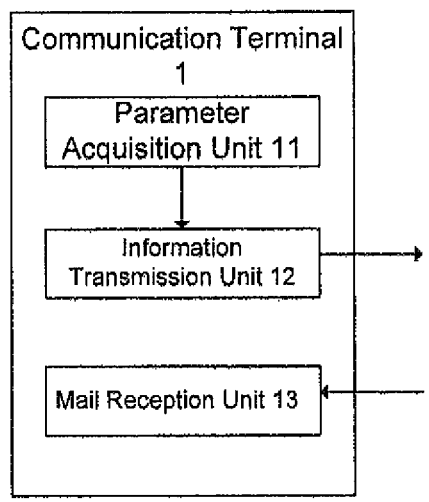
FIG. 1 is an illustrative structure block diagram of an embodiment of a communication terminal according to the present invention.

In certain embodiments, a mail push system may set a push policy based on a mail push technique according to parameters i.e. parameters related to a current user usage state provided by a plurality of communication terminals, and automatically select a communication terminal to which a mail is pushed.

Hereinafter, certain embodiments will be further described in detail by referring to the drawings and the embodiments in order to make the objects, technical scheme and advantages of the present invention more apparent.

As shown in FIG. 1, the communication terminal 1 comprises a parameter acquisition unit 11 for acquiring at least one parameter related to a user usage state; an information transmission unit 12 for transmitting, to a data processing device at a network side, first information related to the at least one parameter related to the user usage state; a mail reception unit 13 for receiving a mail from a mail push device at the network side, wherein the mail is pushed by the mail push device according to mail push indication message which is related to the first information and second information from a second communication terminal, and the second communication terminal is separated from the communication terminal.

The data processing device may be located in the mail push device or stand alone.

The parameter related to the user usage state the user usage state, and/or user position information, and/or device attribute information. The user position information may be acquired by a radio/infrared sensor, according to input processing, or by a temperature sensor.

Taking information transmitted from the information transmission unit of one communication terminal as an example, information transmitted from the information transmission unit 12 comprises at least first information (which is one basic information), and processing information which is related to the first information and obtained by processing the first information, i.e. the processing information is first information related to a parameter which is related to the user usage state. Furthermore, the first information is the parameter related to the user usage state. It should be noted that the first information comprises any combination of the user usage state, user position information and the device attribute information except for only the device attribute information.

The mail push device comprises a mail push server and a mail server; or the mail push device is a server for carrying out a mail push service and a mail service.

In a first embodiment of the communication terminal, when the parameter acquisition unit is a user state sensing unit, and the parameter related to the user usage state is the user usage state, the communication terminal of the embodiment comprises the user state sensing unit, the information transmission unit and the mail reception unit.

The user state sensing unit detects by the radio/infrared sensing or the sensing which is determined based on the input/temperature, and acquires the current user usage state; the current user stage state is transmitted to the parameter processing unit at the network side via the information transmission unit and the parameter acquisition unit at the network side.

The mail reception unit is a mail reception unit capable of supporting mail push client software.

Since the current user usage state transmitted by the user state sensing unit is of positivity and passivity, the user state sensing unit has two conditions as follows.

A first condition is that the user state sensing unit transmits the current user usage state initiatively. Then, the user state sensing unit is further used for timing detection and transmitting the current user usage state to the push device detection module. The push device detection module is located in the parameter processing unit at the network side. Then, the push device detection module may transmit the current user usage state acquired previously to a push policy management module directly.

A second condition is that the user state sensing unit transmits the current user usage state passively. Then, the user state sensing unit is further used for detecting and transmitting the current user usage state to the push device detection module according to a request for detecting the current user usage state from the push device detection module. The push device detection module is located in the parameter processing unit at the network side. Then, the push device detection module may transmit the current user usage state acquired currently to the push policy management module.

The communication terminal further comprises the push policy setting unit for setting a push policy on the communication terminal and transmitting the push policy to a push policy management module and stores therein. The push device detection module is located in the parameter processing unit at the network side.

Figure 2:
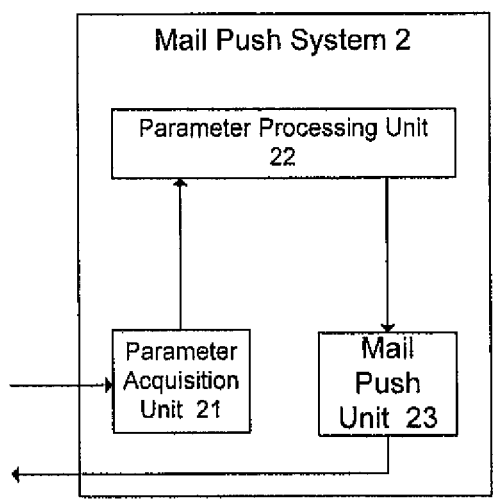
FIG. 2 is an illustrative structure block diagram of an embodiment of a mail push system according to the present invention.

As shown in FIG. 2, a mail push system 2 comprises: a parameter acquisition unit 21 for acquiring fifth information including at least third information and fourth information, the third information and the fourth information come from two separated communication terminals which belong to one user; a parameter processing unit 22 for processing the fifth information including the third information and the fourth information, generating a mail push indication message including terminal information, the terminal information indicating a position attribute of at least one communication terminal; a mail push unit 23 for acquiring a mail based on the indication of the mail push indication message, and pushing the mail to at least one of the at least one communication terminal.

The mail push indication message comprises at least terminal identification information, such as numbers of a mobile terminal, IP address of a computer, etc. The terminal identification information refers to position information required for determining which communication terminal the mail is pushed to. The mail push indication message further comprises push indication information.

The third information/fourth information comprises: a user usage state, and/or user position information, and/or device attribute information; and further comprises only device attribute information. The device attribute information comes from at least two different communication terminals.

For information acquired from the parameter acquisition unit 21 of the mail push system, the information acquired from the parameter acquisition unit comprises the fifth information comprising at least the third information and the fourth information. Specifically, the third information and the fourth information may be basic information, and may also processing information obtained by processing the basic information. The fifth information refers to packaging information generated by packaging the third information and the fourth information.

Since the information acquired by the parameter acquisition information 21 may further comprises only the device attribute information, and the device attribute information comes from at least two different communication terminals which are owned by one user. Therefore, the processing by the parameter processing unit 22 may comprises various conditions.

For example, when only position information is provided by a plurality of communication terminals, the mail push unit only pushes the mail to a device which is closest to the user. When the position information is provided by a part of the plurality of communication terminals and the device attribute information is provided by another part, and the device attribute information is of a picture format which may be supported by the communication terminal, the mail push unit pushes a mail which has pictures to the device which may receive pictures and transmits a prompt message to all of the communication terminals owned by the user to notify the user which communication terminal the mail is pushed to, etc.

In a first embodiment of the mail push system, when the mail push system consists of the mail push server and the mail server, the mail push system comprises a parameter acquisition unit, a user state detection unit and a mail push unit in this embodiment, wherein the parameter processing unit is the user state detection unit in the mail push server.

The user state detection unit is used for transmitting a request for detecting a current user usage state to a user state sensing unit after information indicating that the mail is received is acquired from the mail server; selecting a communication terminal to which the mail is pushed, according to the current user usage state returned via the parameter acquisition unit by the user state sensing unit; and transmitting information indicating that the communication terminal is selected to the mail push unit.

The user state detection unit comprises a push device detection module and a push policy management module.

The push device detection module is used for acquiring the current user usage state from the user state sensing unit after information indicating that the mail is received is acquired from the mail server, and transmitting the current user usage state to the push policy management module. The push policy management module is used for managing and storing a predetermined push policy; selecting the communication terminal to which the mail is pushed, according to the current user usage state and the push policy; and transmitting the information indicating that the communication terminal is selected to the mail push unit.

The mail push server further comprises a mail detection unit for based on a mail transmission protocol, acquiring information indicating that the mail is arrived from the mail server, and transmitting the information indicating that the mail is arrived to the push device detection module in the user state detection unit. Accordingly, the push device detection module acquires the information on the mail from the mail server via the mail detection unit.

Figure 3:
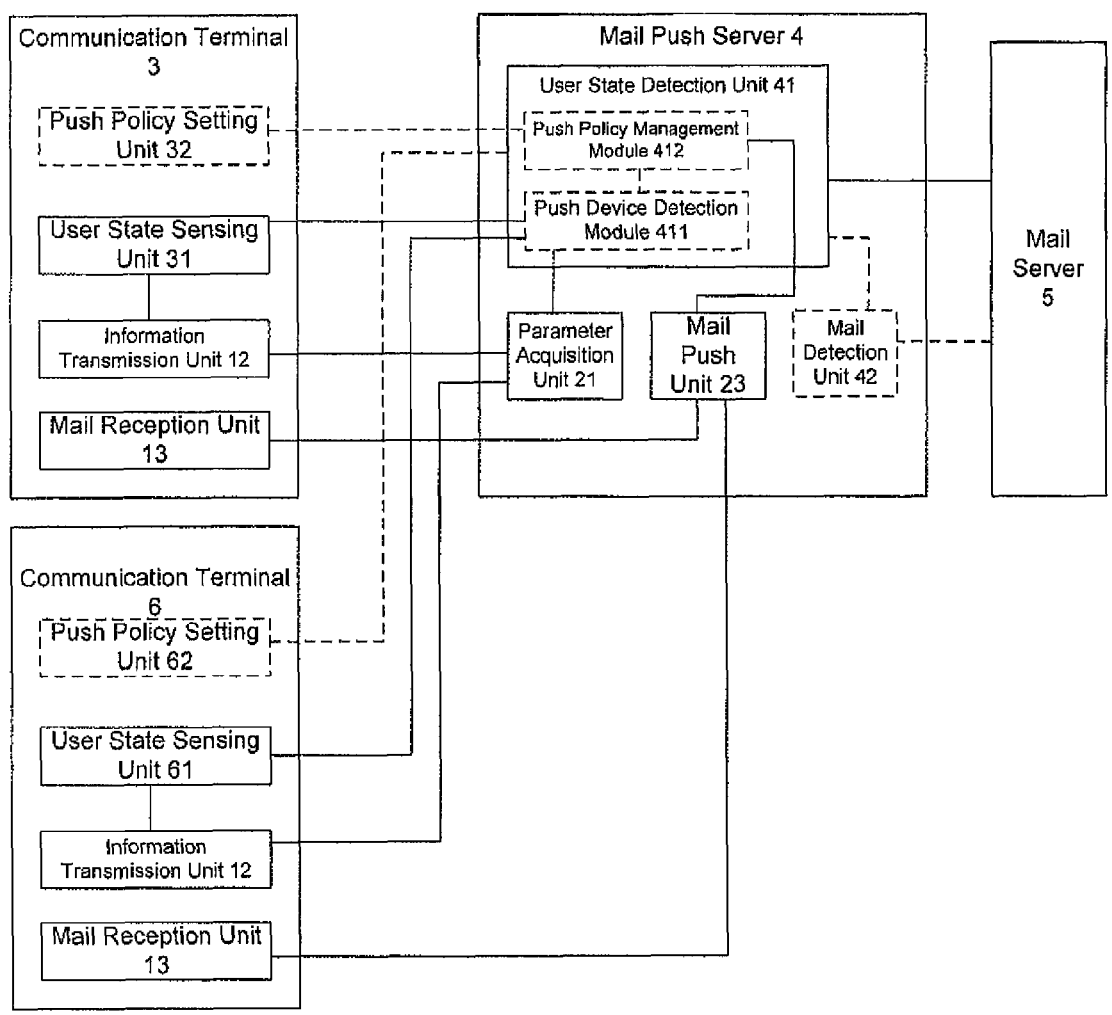
FIG. 3 is an illustrative structure block diagram of an operation state of an embodiment of a communication terminal and a mail push system according to the present invention.

As shown in FIG. 3, FIG. 3 is an illustrative structure block diagram of an operation state of an embodiment of a communication terminal and a mail push system according to the present invention.

The embodiment shown in FIG. 3 comprises a communication terminal 3, a mail push server 4 and a mail server 5.

The communication terminal 3 is connected to the mail push server 4, and is used for detecting a current user usage state and transmitting to the mail push server 4, and then receiving a mail from the push server 4. The mail push server 4 is used for receiving the mail from the mail server 5; selecting a communication terminal to which a mail is pushed according to the current user usage state acquired from the communication terminal 3 and pushing the mail to the selected communication terminal. The mail server 5 is used for managing and storing the mail, and transmitting the mail to the mail push server 4.

Hereinafter, only the communication terminal 3 is taken as an example. However, in an actual operating state, there are a plurality of communication terminals. Furthermore, the communication terminal 3 may be at least two types of an intelligent mobile terminal supporting a mail push or a notebook/desktop supporting a mail push. That is to say, it is guaranteed that the plurality of communication terminals do not belong to one type. The so-called notebook supporting the mail push refers to a notebook which has a wireless wide area network (WWAN) card independently power-supplied to the mail push and corresponding mail push client software, so that the notebook may receive the mail pushed from the mail push server 4 even in the power-off/sleeping state. The so-called desktop supporting the mail push refers to a desktop which has a function of independently power supply for a remote initiation/a network card and corresponding mail push client software so that the desktop may receive the mail pushed from the mail push server 4 even in the power-off/sleeping state.

The communication terminal 3 may be connected to the mail push server 4 in a wired or wireless manner. The connection approach may be any one of an Ethernet, a digital subscriber line (xDSL), a dialing network, a wireless local area network compatible with 802.11 standard (WiFi), a Worldwide Interoperability for Microwave Access (WiMAX), Code Division Multiplex Access (CDMA), Global System for Mobile Communications (GSM)/General Packet Radio Service (GPRS), Enhanced Data Rate for GSM Evolution (EDGE), Wideband CDMA (WCDMA), CDMA2000, Time Division-Synchronization Code Division Multiplex Access (TD-SCDMA), Synchronization Code Division Multiplex Access (SCDMA), Beyond Third Generation wireless communication (B3G), and the Fourth Generation wireless communication (4G).

The mail server 5 may be a mail server in an enterprise, e.g. the enterprise server such as Domino, Exchange Server, Groupware and Foxmail etc. The mail server may also be a mail server providing a mail service on Internet, e.g. the internet mail server such as Hotmail, Gmail, Yahoo Mails Sina Mail and 263 Mail etc.

Regardless of which one of ones of the communication terminals of the intelligent mobile terminal supporting the mail push or the notebook/desktop supporting the mail push may be used in the embodiment as illustrated in FIG. 3, the communication terminal has to be able to implement a function of detecting the current user usage state. In other words, the communication terminal is a mail push communication terminal which has a function of sensing the user state. Accordingly, the mail push server has to be capable of automatically selecting the communication terminal to which the mail is pushed according to the current user usage state.

Then, as illustrated in FIG. 3, the communication terminal 3 comprises a user state sensing unit 31, an information transmission unit 12 and a mail reception unit 13. The mail push server 4 comprises a user state detection unit 41, a parameter acquisition unit 21 and a mail push unit 23.

The mail reception unit 13 is used for receiving the mail from the mail push unit 23. The information transmission unit 12 is used for transmitting the current user usage state acquired from the user state sensing unit 31 to the parameter acquisition unit 21. The user state detection unit 31 is used for detecting in a sensing approach by the radio/infrared sensing or the sensing which is determined based on the input/temperature, acquiring the current user usage state and transmitting to the user state detection unit 41; or transmitting the current user usage state to the user state detection unit 41 via the information transmission unit 12 and the parameter acquisition unit 21. Here, the mail reception unit 13 is the mail reception unit capable of supporting the mail push client software.

Specifically, the so-called infrared sensing means that when the communication terminal is in a power-on state and the user state sensing unit such as a radio sensor at the terminal side detects the user, it is known that the user is using the communication terminal. The so-called sensing which is determined based on the input means that when the communication terminal is in a power-on state and the user state sensing unit at the terminal side detects that the user performs an input operation on the communication terminal in recent period of time, e.g. moving a mouse, touching a screen, pressing a keyboard, plugging and pulling an accessory including an earphone and a storage card, and adjusting a volume button etc., it is known that the user is using the communication terminal. The so-called sensing which is determined based on the temperature means that when the communication terminal is in a power-on state and the user state sensing unit such as the temperature sensor at the terminal side detects that the temperature of some part of the communication terminal is keeping around the temperature of the user, it is known that the user is carrying the communication terminal and is currently using the communication terminal.

The mail push unit 23 is used for receiving the information of the selected communication terminal from the user state detection unit 41, and pushing the mail to the mail reception unit 13 of the selected communication terminal. The user state detection unit 41 is used for transmitting a request for detecting the current user usage state to the user state sensing unit 31, selecting the communication terminal to which the mail is pushed according to the current user usage state returned by the user state sensing unit 31, and transmitting the information of the selected communication terminal to the mail push unit 23. Here, the user state detection unit 41 comprises a push device detection module 411 and a push policy management module 412.

The push device detection module 411 is used for acquiring the current user usage state from the user state sensing unit 31 after information indicating that the mail is received is acquired from the mail server 5, and transmitting the current user usage state to the push policy management module 412. The push policy management module 412 is used for managing and storing a predetermined push policy, wherein the policy may be set by the user by means of any type of the communication terminal which may be the intelligent mobile terminal to which the mail is pushed or the notebook/desktop supporting to the mail push, or may be set in a WEB way by means of other devices except for these types logging on the WEB. According to the current user usage state and the push policy, the push policy management module 412 selects the communication terminal to which the mail is pushed and transmits the information indicating that the communication terminal is selected to the mail push unit 23.

The user state sensing unit 31 is further used for timing detection and transmitting the current user usage state to the push device detection module 411. Then, the push device detection module 411 may directly transmit the current user state information obtained previously to the push policy management module 412.

Or, the user state sensing unit 31 is further used for detecting and transmitting the current user usage state to the push device detection module 411, according to the request for the current user usage state from the push device detection module 411. Then, the push device detection module 411 may transmit the current user state information obtained currently to the push policy management module 412.

In the embodiment as shown in FIG. 3, the communication terminal 3 further comprises a push policy setting unit 32 for setting a push policy on the communication terminal 3 and transmitting the push policy to the push policy management module 412 and storing therein. The mail push server 4 further comprises the mail detection unit 42 for acquiring, from the mail server 5, information indicating that the mail is arrived, and transmitting the information indicating that the mail is arrived to the user state detection unit 41.

It should be noted that functions of the mail push server 4 and the mail server 5 in the embodiment shown in FIG. 3 may be integrated in one server.

The mail transmission protocol comprises a POP3/SMTP protocol, a dedicated mail transmission protocol/specifically defined mail transmission protocol supported by the mail server, or a specification of Application Programming Interface (API) applied to the mail transmission.

Particularly, the dedicated mail transmission protocol refers to a dedicated interface defined, by a mail server manufacturer such as Domino, for the mail server provided based on the protocol. The specifically defined mail transmission protocol refers to a protocol defined by other manufacturer than the manufacturer of the mail server.

As noted, FIG. 3 only illustrates an illustrative structure block diagram of an operation state of two communication terminals and a mail push system. In FIG. 3, the other communication terminal 6 comprises a push policy setting unit 62, a user state sensing unit 61, an information transmission unit 12 and a mail reception unit 13. In practice, the operation state graph is generally constituted by a plurality of communication terminals belonging to one user and the mail push system.

A mail push method, comprises: acquiring eighth information including at least sixth information and seventh information, the sixth information and seventh information come from two separated communication terminals which belong to one user; processing the eighth information including the sixth information and the seventh information, generating a mail push indication message including terminal information, the terminal information indicating a position attribute of at least one communication terminal; and acquiring a mail based on the indication of the mail push indication message, and pushing the mail to at least one communication terminal.

Here, the mail push method has three conditions according to acquired different information.

A first condition is that the acquired information is user usage state information or position information. Then, the method comprises setting a push policy according to current user usage state or position information, and pushing the detected mail directly to one determined communication terminal which belongs to the user. The communication terminal is determined based on the current user usage state or the position information. For example, after the position information is acquired from the plurality of communication terminals belonging to one user, if the set push policy is to push the mail to the communication terminal which is closest to the user, the mail will be pushed to the determined communication terminal, i.e. the communication terminal closest to the user. After the position information is acquired from the plurality of communication terminals belonging to one user, if the set push policy is to push the mail to the communication terminal which is used by the user currently, and the communication terminal is a desktop, the mail will be pushed to the determined communication terminal, i.e. the desktop which is used by the user currently. In summary, when the acquired information is the user usage state or the position information, the mail may only be pushed to a determined communication terminal belonging to one user.

A second condition is that the acquired information is user usage state/position information and device attribute information. Since the acquired information includes the device attribute information, the mail may be pushed to the plurality of communication terminals belonging to one user. Then, the method comprises: setting a push policy according to current user usage state/position information and device attribute information, and pushing the detected mail to a communication terminal which belongs to the user and supports the device attribute; simultaneously, prompt information is pushed to at least one communication terminal which belongs to the user and does not support the device attribute.

For example, the plurality of communication terminals belonging to one user acquire the position information and the device attribute information and the communication terminals of the user are three mobile phones, wherein the device attributes of two of the phones are only supporting a black-and-white screen and only one phone supporting a color screen and capable of receiving photos. When the mobile phone closest to the user has the black-and-white screen and the mail comprises photos, the push policy based on setting is to push the mail to the mobile phone closest to the user, the mail may be pushed to the mobile phone with the color screen in connection with the device attribute of the mobile phone. Simultaneously, the user is notified that a mail including photos has been pushed to one of the mobile phones, so as to facilitate the user to inquire the photos.

A third condition is that the acquired information is user usage state. Then the method comprises predetermining the push policy, and further comprises: detecting that the mail arrives at the mail push server; selecting, by the mail push server, the communication terminal to which the mail is pushed, according to the current user usage policy and the push policy reported by the communication terminal; and pushing, by the mail push server, the mail to the selected communication terminal.

According to the flowchart of the method in the third condition, the method further comprises: performing timing detections on the current user usage state on respective communication terminals and reporting the current user usage state to the mail push server by all of the communication terminals. Or, the method further comprises: initiating a request for detecting the current user usage state of all the communication terminal by the mail push server, said all the communication terminals detecting the current user usage state on respective communication terminals and reporting the current user usage state to the mail push server.

Figure 4:
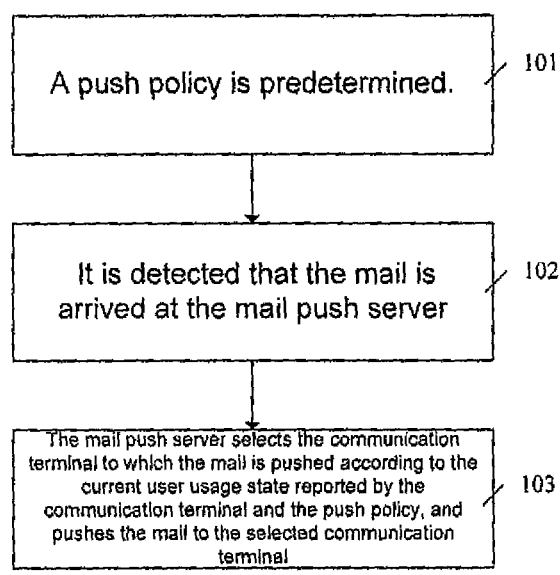
FIG. 4 is an illustrative flowchart for implementing an embodiment of a method according to the present invention.

As shown in FIG. 4, in a first embodiment of the method, the mail push method of the embodiment comprises steps as follows based on the acquired user usage state.

In step 101, a push policy is predetermined.

The push policy comprises pushing the mail to the communication terminal which is used by the user; or, pushing the mail preferably to a notebook, if it is detected in the communication terminal that the notebook to which the mail is pushed is powered on; or, pushing the mail preferably to a desktop, if it is detected in the communication terminal that the desktop to which the mail is pushed is powered on; or, pushing the mail simultaneously to at least two communication terminals of a mobile terminal supporting the mail push function and a notebook/desktop supporting the mail push function among the communication terminals.

In step 102, it is detected that the mail is arrived at the mail push server.

In step 103, the mail push server selects the communication terminal to which the mail is pushed according to the current user usage state reported by the communication terminal and the push policy, and pushes the mail to the selected communication terminal.

Here, the approach by which the mail is pushed to the selected communication terminal in step 103 is any of the approaches of a mail push technique (WAP Push) for notifying arrival of the mail based on WAP protocol, a mail push technique (Phone Push) for simulating the push of the mail to the mobile device by a telephone call, or a mail push technique (IP Push) for notifying arrival of the mail based on TCP/IP protocol.

The present invention may be implemented in two implementation modes due to two conditions in which the communication initiatively performs a timing detection, or the mail push server initiatively performs a detection.

In a first implementation mode, in a case where the communication initiatively performs the timing detection, the method of the present invention further comprises between steps 102 and 103:

Step 1021 in which all of the communication terminals perform timing detections on the current user usage state on respective communication terminals and report the current user usage state to the mail push server.

In a second implementation mode, in a case where the mail push server initiatively performs the detection, the method of the present invention further comprises between steps 102 and 103:

Step 1022 in which the mail push server detects a request for the current user usage state on all of communication terminals; all of the communication terminal detect the current user usage state on respective communication terminals, and report the current user usage state to the mail push server.

The above is only the preferred embodiments of the present invention and the present invention is not limited to the above embodiments. Therefore, any modifications, substitutions and improvements to the present invention are possible without departing from the spirit and scope of the present invention.

What is claimed is:

1. A communication terminal comprising:
a parameter acquisition unit configured to acquire at least one parameter related to a user usage state;
an information transmission unit configured to transmit, to a data processing device at a network side, first information including the at least one parameter related to the user usage state; and
a mail reception unit configured to receive a mail from a mail push device of a mail push server at the network side, wherein the mail is pushed by the mail push device according to a mail push indication message which is related to at least the first information and second information from a second communication terminal, wherein the mail push indication message is determined by the first information and the second information, and wherein the second communication terminal is separated from the communication terminal, and the second communication terminal and the communication terminal belong to one user,
wherein the mail push server includes a user state detection unit for generating the mail push indication message, the user state detection unit comprising a push device detection module and a push policy management module,
wherein the parameter acquisition unit is a user state sensing unit, the user state sensing unit being configured to detect a current user usage state by sensing an input operation on an input means of the communication terminal in a recent period of time, and the user state sensing unit being further configured for detecting and transmitting the current user usage state to the push device detection module at the network side on a periodic basis or according to a request for detecting the current user usage state from the push device detection module;
wherein the push device detection module acquires current user usage state based on the first information and the second information received from the communication terminal and the second communication terminal, respectively, and transmits the current user usage state to the push policy management module,
wherein the push policy management module manages and stores predetermined push policy, selects the communication terminal to which the mail is pushed according to the current user usage state and the push policy, and transmits the mail push indication message indicating the selected communication terminal, to the mail push device; and wherein the parameter acquisition unit, the information transmission unit and the mail reception unit are executed by a processor.

2. The communication terminal according to claim 1, wherein the parameter comprises the user usage state, and/or user position information, and/or attribute information.

3. The communication terminal according to claim 2, wherein the user position information is acquired by a radio/infrared sensor, according to input processing, or by a temperature sensor.

4. The communication terminal according to claim 1, wherein the mail push device comprises a mail push server and a mail server or the mail push device is a server for carrying out a mail push service and a mail service.

5. The communication terminal according to claim 1, wherein the mail reception unit comprises a mail reception unit capable of supporting mail push client software.

6. The communication terminal according to claim 1, wherein the communication terminal comprises a push policy setting unit for setting a push policy on the communication terminal and transmitting the push policy to a push policy management module for storing therein.

7. A mail push server for communication with communication terminals comprising:
a parameter acquisition unit for acquiring first information and second information from two separated communication terminals which belong to one user, wherein each of the first information and the second information includes at least one parameter related to a user usage state;
a user state detection unit for processing the first information and the second information and generating a mail push indication message including terminal information, the terminal information indicating a position attribute of at least one communication terminal; and
a mail push unit for acquiring a mail based on the indication of the mail push indication message, and pushing the mail to at least one communication terminal,
wherein the user state detection unit comprises a push device detection module and a push policy management module, wherein the push device detection module is configured to transmit a request for detecting a current usage state to a user state sensing unit at the communication terminal side after information indicating that the mail is received is acquired from the mail server and acquires a current user usage state via the parameter acquisition unit reported from the user state sensing unit at the communication terminal side, and configured to transmit the current user usage state to the push policy management module, wherein the current user usage state is detected by the user state sensing unit by sensing an input operation on an input means of the communication terminal in a recent period of time, and transmitted by the user state sensing unit to the push device detection module on a periodic basis or according to the request for detecting the current user usage state from the push device detection module; and
the push policy management module is configured to manage an store a predetermined push policy, select the communication terminal to which the mail is pushed according to the current user usage state and the push policy, and transmit information indicating the selected communication to the mail push unit; and
wherein the parameter acquisition unit, the user state detection unit, the mail push unit, the push policy management module and the push device detection module are executed by a processor.

8. The mail push server according to claim 7, wherein at least one of the first information and the second information comprises: a user usage state, and/or user position information, and/or device attribute information.

9. A mail push method, comprising:
acquiring first information and the second information from two separate communication terminals which belong to one user, wherein each of the first information and the second information includes at least one parameter related to a user usage state;
processing at a mail push server the first information and the second information and generating a mail push indication message including terminal information, the terminal information indicating a position attribute of at least one communication terminal;
acquiring a mail based on the indication of the mail push indication message, and pushing the mail to at least one communication terminal,
initiating, by the mail push server, a request for detecting current user usage state on the communication terminal and;
the method further comprises setting a push policy according to the current user usage state or position information, and further comprises:
detecting that the mail arrives at the mail push server;
reporting the current user usage states to the mail push server; and
selecting, by the mail push server, the communication terminal to which the mail is pushed, according to the current user usage state and the push policy reported by the communication terminals, and pushing the detected mail directly to the selected communication terminal, wherein the current user usage state is detected by the communication terminals by sensing an input operation on an input means of the communication terminals in a recent period of time, and transmitted by the communication terminals to the mail push server on a periodic basis or according to a request for detecting the current user usage state from the mail push server.

10. The method according to claim 9, wherein the acquired first and second information comprises user usage state/position information and device attribute information, the method further comprising: setting a push policy according to current user usage state/position information and device attribute information, pushing the detected mail to a communication terminal which belongs to the user and supports the device attribute, and pushing a prompt message to at least one communication terminal which belongs to the user and does not support the device attribute.

11. The method according to claim 9, wherein the push policy comprises: pushing the mail to the communication terminal which is currently used by the user; or, pushing the mail preferably to a notebook, if it is detected in the communication terminal that the notebook to which the mail is pushed is powered on; or, pushing the mail preferably to a desktop, if it is detected in the communication terminal that the desktop to which the mail is pushed is powered on; or, pushing the mail simultaneously to at least a mobile terminal supporting the mail push function and a notebook or desktop supporting the mail push function, among the communication terminals.

12. The method according to claim 9, wherein the mail push server pushes the mail to the selected communication terminal based on any of the following: a mail push technique WAP Push for notifying arrival of the mail based on WAP protocol, a mail push technique Phone Push for simulating the push of the mail to the mobile device by a telephone call, or a mail push technique IP Push for notifying arrival of the mail based on TCP/IP protocol.

\* \* \* \* \*